United States Patent Office 3,574,551
Patented Apr. 13, 1971

3,574,551
METHOD FOR DETERMINING PHOSPHATE CONTENT OF LIQUIDS CONTAINING POLYPHOSPHATE COMPOUNDS
Charles A. Noll, Philadelphia, Pa., and Louis J. Stefanelli, Pennsauken, N.J., assignors to Betz Laboratories, Inc., Trevose, Pa.
No Drawing. Filed Dec. 9, 1968, Ser. No. 782,472
Int. Cl. G01b 25/26; G01n 33/18
U.S. Cl. 23—230                                10 Claims

ABSTRACT OF THE DISCLOSURE

Test method for determining the phosphate content of liquids containing complex phosphates or polyphosphate compounds, comprising adding to a small sample of the liquid to be tested a first aqueous solution comprising a water soluble ferric salt, an alkali metal halide, an alkali metal salt of a lower fatty acid and a first lower fatty acid. The resulting solution is then allowed to mix and a second solution comprising a hydroxybenzoic acid and a second lower fatty acid is added thereto. The color intensity of the resulting solution is then measured and compared to a known standard.

BACKGROUND OF THE INVENTION

The technology of water treatment industry has reached a high degree of sophistication. Presently many many compositions are utilized in order to protect the metallic parts of large and expensive steam producing apparatus, cooling systems and water conveying means. In fact, wherever there is water present and in contact with a metal structure, corrosion or scale deposition becomes a very significant problem. The areas of concern range anywhere from the metallic structure of the cooling water tower to the drilling or fractionating apparatus utilized in oil fields. Throughout the history of the water treatment field, phosphate has found extensive use either alone or in combination with other materials to either control corrosion or to control the deposition of detrimental scale.

Determinations of phosphate content are generally made in order to control chemical treatment containing phosphate. While the phosphate test is employed most frequently in boiler water control, a determination of ortho- and polyphosphate is used as a control test in the treatment of water in cooling systems, distribution lines, etc. where polyphosphates are employed for scale and corrosion control. In cooling water systems, the surface active properties of the polyphosphates are employed to advantage in preventing the precipitation of calcium carbonate. By use of these materials and organic surface active agents as well, it is possible to retain calcium carbonate in solution at a positive saturation index which would otherwise result in scale formation.

In water distribution lines, municipal systems, etc. the polyphosphates are used for the control of tuberculation and some reduction in corrosion. The phosphates whether they be the complex phosphate or the standard orthophosphate when used in combination with chromate is a corrosion control for open recirculating cooling water. This combination of two anodic inhibitors, in the proper ratio and under control of pH conditions, effectively inhibits pitting and tuberculation and provides superior protection compared to the use of either of these inhibitors alone.

The phosphates commonly employed include the water-soluble molecularly dehydrated or complex phosphates such as sodium tripolyphosphate, sodium hexaphosphate, sodium decaphosphate, sodium hexametaphosphate and the corresponding potassium, lithium, ammonium and other water-soluble salts which are characterized by a range of $Na_2O$, or an equivalent, to $P_2O_5$ of between 1 to 1 and 2 to 1. These compounds and their use with other materials are set forth in U.S. Pats. 2,999,732, 2,900,222 and 2,872,281. The latter two patents also establish that materials such as actaphos ($Na_{12}P_{10}O_{31}$), sodium pyrophosphate, sodium septaphosphate, and the potassium, lithium, ammonium or equivalent water-soluble salts can be used effectively. Moreover, in some instances the complex phosphoric acids have also been used quite successfully.

In recent years a complex phosphates of the organic and/or the amine variety have found extensive use as corrosion and/or scale controlling agents. Amino phosphonic acid derivatives which have found extensive use are disclosed in U.S. Pats. 2,599,807, 2,841,611 and 3,234,124. The amino-alkylidene phosphonic acids and the salts thereof possessing the formula

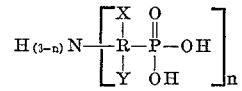

wherein R is a lower alkylene, X and Y are hydrogen or lower alkyl and $n$ is an integer of from 1 to 3 have found extensive use in the threshold treatment of cooling water systems. Moreover, organic phosphates or phosphonates have also found considerable use as cooling water corrosion control agents.

The organic phosphates fall into the same class as the complex inorganic phosphate and compounds of this nature are disclosed together with their methods of use in copending U.S. application Ser. No. 450,220 and now abandoned. In addition, the slowly-soluble polyphosphate as disclosed in U.S. Pat. 3,288,217 have also found some use.

Although the above-described phosphate materials have found successful use, the industry is continually concerned with the maintenance of the proper levels of the phosphate compounds within the systems or waters being treated. As can be appreciated, the phosphate level will be entirely dependent upon the water being utilized in the system. Water possessing high hardness will necessarily require a greater quantity of phosphate to control deposition. Although the phosphate compounds perform effectively, it is well known that it is undesirable to add to any water or system any additional component which may, when used in excess, act detrimentally to the system involved. Accordingly, it is evident that proper control should be maintained at all times. For this purpose, numerous tests have been suggested and are currently being used in the field.

The tests which are utilized to determine the orthophosphate or the uncomplex phosphate content of waters are particularly effective for that purpose. However, these tests are not effective when complex or polyphosphates are involved. Before the tests for complex phosphate can be used successfully or effectively with the hope of any degree of accuracy, a sample containing the complex phosphate must be pretreated to convert the polyphosphate into a basic or orthophosphate compound. For example, in order to determine the total phosphate in a particular water it is necessary to convert all of the polyphosphate in the sample to orthophosphate. This result is accomplished by utilizing two clear samples of the water wherein one sample is used as a blank and the other sample for analysis. To each sample is added sulfuric acid. The samples are then boiled and stirred vigorously for at least thirty minutes. Distilled water must be added periodically to insure that the volume does not fall below a particular point. If in fact, the volume does fall below a particular point, the sample must be discarded.

The samples are then cooled to room temperature at which time three drops of phenolphthalein indicator are added to each of the samples. The samples are neutralized with caustic and sulfuric acid is then added dropwise until the solution becomes colorless. Since some heat may be generated during the neutralization, the samples must be recooled and adjusted to a particular volume with distilled water. At this point, the total phosphate can be determined by proceeding according to the conventional test utilized to determine phosphate. The Betz Handbook of Industrial Water Conditioning, sixth edition, 1962, on pages 391 through 394 sets forth the conventional tests utilized in this regard.

From the foregoing it was evident to the present inventors, that a new test procedure must be devised which was free of the attendant disadvantages commonly found with the procedure currently being used. Their goal was to devise a method which was simple, relatively non-time consuming, eliminated the necessity for the boiling of the sample and of course, one which would eliminate the necessity for the use of concentrated sulfuric acid.

After much research and development work, the present inventors ascertained that the foregoing objectives could be fully realized by utilizing the method as hereinafter described. The method generally entails the steps of adding to a small sample of the liquid containing the complex or polyphosphate a first aqueous solution comprising a water-soluble ferric salt, an alkali metal halide, an alkali metal salt of a lower fatty acid and a first lower fatty acid. The sample of the liquid to be tested, preferably, is filtered before the addition of the first aqueous solution. This can be accomplished satisfactorily by filtering through a Whatman number 4 filter paper and rejecting the first 20 milliliters. After the resulting solution has been allowed to react and mix for a short time, a second solution comprising a hydroxybenzoic acid and a second lower fatty acid is added. After a short time, a distinct color develops and this color and its intensity is measured and compared to known standards.

The first aqueous solution generally comprises from about 3 to about 9% by weight of the water-soluble ferric salt which preferably is ferric chloride. The alkaline metal halide preferably used is sodium fluoride and is present in the test solution in an amount of from about 10 to 30% by weight. The alkali metal salt of the lower fatty acid is present by weight in the test solution in an amount of from about 1 to 3%. In referring to "lower fatty acid" it is intended by this specification that this terminology include the fatty acids having from 1 to 6 carbon atoms. Sodium acetate was found to be quite effective when utilized in the test solution.

As earlier stated, the lower fatty acid is an acid of from 1 to 6 carbon atoms and is present in the test solution in an amount of from about 25 to 75% by weight. The remaining percentage by weight is constituted by water. The second solution contains from about 0.5 to 5% by weight of the hydroxybenzoic acid, preferably salicylic acid and the remaining percentage of the solution is made up of a lower fatty acid which has the same limitations as set forth above. It has been found to be quite advantageous to utilize the same acids throughout the test solutions. For example, if acetic acid is utilized as the fatty acid in the first test solution, this acid should also be the acid which is used in combination with the hydroxybenzoic acid of the second test solution. Moreover, it is preferable for the alkaline metal salts of the fatty acid to be the alkali metal salt of the acid which is used in test solutions.

At this time, it would probably be advisable to point out that in using the test method of the present invention that certain standardization must be made. The entire substance of the method resides in the measurement either electronically or by visual comparison of the color intensity of the sample solution which has been treated according to the present invention. The use of different compounds such as propionic acid in place of the acetic acid, or resorcylic acid in place of salicylic acid or even the use of a larger quantity of one test solution may give rise to color changes which are not directly comparable to the colored standards or intensities previously prepared or measured.

A certain proportion of the test solutions when utilized in conjunction with a certain amount of the liquid samples will yield a distinct color intensity. The color intensity may then be measured or compared to the intensity of solutions which contain known quantities of polyphosphate or complex phosphate. In this, manner the concentration of the polyphosphate or complex phosphate in the sample can easily be ascertained. However, more economically and as customarily utilized in the field, Taylor slides are produced which slides are the same in color intensity as the color of the corresponding samples of liquid containing known concentrations of polyphosphate or complex phosphate. The sample solution can then be compared visually with the Taylor slides. The use of Taylor slides has been very successful in other areas and works equally well in the present invention. Moreover, the use of Taylor slides adds a distinct advantage in that it is economical and does not require electronic equipment to make on-the-spot determinations.

Having thus generally described the inventive method, more specific examples will now be set forth.

EXEMPLARY TEST PROCEDURE

Theory of test

In an acid environment ferric ion is complexed by polyphosphates. If a standard ferric iron solution is added in excess of the complex-phosphate present in a test sample, the unreacted amount of the iron standard can be measured colorimetrically. Ferric ion plus salicylic acid forms a red color complex which results in an inverse standard curve, that is, the color diminishes as the concentration of the complex-phosphate increases. The color change is proportional to the concentration of the complex-phosphate.

Procedure

The test method makes use of two testing solutions, a color comparator and slides. The formula for the first solution is as follows:

Test Solution No. 1:
    $FeCl_3$ as Fe—66.6 mg.
    NaF as NaF—200.0 mg.
    Sodium acetate as NaAc—20.0 grams.
    Glacial acetic acid—500 ml.
    Made up to 1 liter with distilled water.

The formula for the second solution is as follows:

Test Solution No. 2: Salicylic acid—10 grams in a liter of 50% glacial acetic acid.

The volume of the sample tested is 50 ml. When the complex-phosphate to be tested is potassium pyrophosphate, an organic-polyphosphate or an amino-organic phosphonic acid or salt thereof, the sample must be diluted by a 1:1 ratio i.e. 25 mls. of sample and 25 ml. of phosphate-free water. The sample tested should be clear. This can be accomplished satisfactorily by filtration through a Whatman No. 4 filter paper (the first 20 mls. are rejected). Five mls. of Test Solution No. 1 is accurately added by delivery pipet to the clear sample, allowed to react for at least 2 minutes before the addition of 1 ml. of Test Solution No. 2. After at least 2 minutes, the colored solution is then poured into the comparator cell and matched to one of the color standards. The slide is marked in p.p.m. complex-phosphate as $PO_4$.

Example 1.—In order to establish the relationship of color intensity to concentration of polyphosphate of the sample the following experiments were conducted. Four complex-phosphates were tested viz. sodium tripolyphosphate, sodium hexametaphosphate, tetrapotassium pyrophosphate and an aminotri (alkylidenephosphonic acid), having the formula

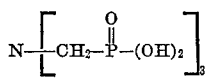

were firstly prepared and made into sample solutions.

Aliquot samples of the respective polyphosphates contained sufficient complex phosphate to represent 0, 5, 10, 15 and 20 p.p.m. of phosphate ($PO_4$).

The test procedure described above was followed and in order to measure the color development accurately, a Leitz colorphotometer equipped with a 520 m$\mu$ filter and a 10 x 10 mm. optical cell was used.

The color intensity measurements indicated that the complex phosphates produced a linear progression with respect to concentration. However, one important factor was discovered from the testing. It was observed that if the pH of Test Solution No. 1 was too acidic (below 1.9), proper color development was inhibited. Accordingly, separate tests were conducted to determine the optimum pH range for color development. These tests revealed that best color development was obtained in the pH range of 2 to 3. Therefore, when the buffer (e.g. sodium acetate and acetic acid) was added to the solution in such quantity as to maintain a pH of 2.5, all samples of the complex phosphate followed the normal and uniform color progression.

Since the quantity of the complex phosphates in each of the respective samples was known by virtue of its being carefully prepared utilizing known compounds and quantities, the samples were compared to each other to ascertain whether there were any differences in color intensity. It was resolved that it did not matter what compound was used to produce the samples, the color intensities of the samples having the same phosphate concentration were the same.

Example 2.—Since the waters which would be subjected to the testing would contain various ions, either inherently present or added as treatment chemicals, experiments were conducted to determine the effect, if any, the various ions would impart to the color development.

Samples of various complex phosphates in known quantities represented as phosphate were produced and ions common to cooling waters were added within the practical limits of their occurrence in these waters for testing for possible interference. The investigation of the ion was discontinued when this limit was reached. The concentrations of the ions tested without interference are listed in the following table.

TABLE #1.—MAXIMUM CONCENTRATIONS OF IONS TESTED WITHOUT INTERFERENCE

| Ion: | Concentration in p.p.m. |
|---|---|
| Zinc as Zn | 10 |
| Copper as Cu | 10 |
| Chromium as $Cr^{+3}$ | 30 |
| Iron as $Fe^{+2, +3}$ | 2 |
| Aluminum as Al | 6 |
| Calcium as $CaCO_3$ | 1000 |
| Magnesium as $CaCO_3$ | 200 |

In all cases, the ions present in the samples did not interfere with the accuracy of the test procedure.

Example 3.—In order to confirm the findings of Example 2 a more practical approach of testing actual tower samples was taken. Water samples were taken from different sections of the country so that the waters would be as diversified as possible with repect to their make-up. A standard amount of complex-phosphate was added to the sample and after properly blanking out the sample, the complex-phosphate was measured. No difficulty was encountered with any of the complex phosphates previously listed. However, as a matter of convenience only amino-tri (methylene phosphonic acid) is listed in the following table. The readings are expressed in "dials" and were made utilizing a Leitz colorphotometer. The relationship of the dial readings with the p.p.m. of complex-phosphate as phosphate is set forth below.

COMPLEX-PHOSPHATE MEASURED IN COOLING WATER SAMPLES

| Water sample from— | Dial readings as received | Dial readings after addition of 10 p.p.m. phosphonic acid | Change in dials |
|---|---|---|---|
| Indianapolis, Ind | 50 | 33 | 17 |
| Terre Haute, Ind | 52 | 32 | 20 |
| Jacksonville, Fla | 44 | 24 | 20 |
| Utica, N.Y | 45 | 25 | 20 |
| Lancaster, Pa | 40 | 24 | 16 |
| Chicago, Ill | 49 | 30 | 19 |
| Downey, Calif | 40 | 22 | 18 |
| Level Land, Tex | 48 | 28 | 20 |
| Pike Town, Ohio | 48 | 32 | 16 |

The relationship of the dial readings as p.p.m. complex-phosphate as $PO_4$, was as follows.

P.p.m. complex-phosphate as $PO_4$
present:                                      Dial readings
    0 ---------------------------------------- 52
    5 ---------------------------------------- 44
   10 ---------------------------------------- 36
   15 ---------------------------------------- 28
   20 ---------------------------------------- 20

The normal dial difference between the blank and 10 p.p.m. of the complex-phosphate in distilled water is 18 dials.

The foregoing tests established the effectiveness of the test procedure.

Example 4.—A water sample was taken from a cooling system which was being treated with sodium tripolyphosphate. A portion of the sample was tested according to the procedure outlined above for complex-phosphate as phosphate. The total phosphate level of the water was then determined by measuring the actual phosphate content. This value was compared to the value obtained when a sample of the water was evaluated for phosphate content according to a conventional procedure (Betz Handbook). The comparison established that the procedure of the invention was as accurate as the conventional procedure. However, a comparison of the time and the ease of determining the phosphate clearly established that the present procedure could be performed more quickly and more easily than the conventional process.

Example 5.—Example 4 was repeated, however in this case the water sample was taken from a cooling system which was being treated with a composition containing tetra-potassium pyrophosphate.

Again it was ascertained that the present procedure was as effective as the conventional procedure but more efficient time-and performance-wise.

Example 6.—In order to establish the accuracy of the present test procedure with respect to organic polyphosphates, aqueous solutions containing known concentrations respectively of dioctyl polyphosphate and di-(octylethylene oxide adduct) pyrophosphate were prepared, divided into equal portions, and the first portions of each were tested according to the present invention.

The second portions of each solution were then subjected to a conventional test for phosphate and the results obtained were compared to those obtained utilizing the present test method. It was conclusively established that the present test was not only accurate but much simpler to conduct.

Having thus described the invention both generally and specifically, what we now claim is:

1. A method for determining the phosphate content of a water containing polyphosphates or complex phosphates which comprises adding to a small sample of said water a first aqueous solution comprising a water-soluble ferric salt, an alkali metal halide, an alkali metal salt of a lower fatty acid and a lower fatty acid, mixing the resulting solution, adding to said resulting solution a second solution comprising a hydroxybenzoic acid and a lower fatty acid, and ascertaining the color intensity of the resulting solution.

2. A method according to claim 1 wherein the color intensity is ascertained by comparison with the color intensity of standard color solutions which represents known phosphate concentrations.

3. A method according to claim 1 wherein the alkali metal salt of the lower fatty acid is sodium acetate and wherein said lower fatty acids are acetic acid.

4. A method according to claim 1 wherein the hydroxybenzoic acid is salicylic acid.

5. A method according to claim 1 wherein the water is filtered prior to the addition of the first aqueous solution.

6. A method according to claim 1 wherein the water is a cooling water.

7. A method according to claim 1 wherein the first aqueous solution comprises from about 3 to 9 percent by weight of ferric chloride, from about 10 to 30 percent by weight of said alkali metal fluoride, from about 1 to 3 percent by weight of the alkali metal salt of the lower fatty acid, and from about 25 to 75 percent by weight of said lower fatty acid and wherein said second solution contains from about 0.5 to 5 percent by weight of said hydroxybenzoic acid.

8. A method according to claim 1 wherein said first solution comprises about 6 to 7 percent by weight of ferric chloride; about 20 percent by weight of sodium fluoride; about 2 percent by weight of a sodium acetate, and about 50 percent by weight of glacial acetic acid; and wherein said second solution comprises from about 0.8 to 1 percent by weight of salicylic acid dissolved in a 50 percent glacial acetic acid solution.

9. A method according to claim 8 wherein a sample of approximately 50 milliliters is used.

10. A method according to claim 9 wherein the water contains a complex phosphate selected from the group consisting of a potassium complex phosphate and an organic complex phosphate, and wherein a 25 milliliter sample of this water is diluted with phosphate free water to make the 50 milliliter sample.

References Cited

Chess et al.: Anal. Chem., 30, 111–112 (1958).

MORRIS O. WOLK, Primary Examiner

R. M. REESE, Assistant Examiner